US008275613B2

(12) United States Patent
Harter et al.

(10) Patent No.: US 8,275,613 B2
(45) Date of Patent: Sep. 25, 2012

(54) ALL VOICE TRANSACTION DATA CAPTURE—DICTATION SYSTEM

(75) Inventors: F. James Harter, Edgewater, MD (US); Daniel Sternklar, Columbia, MD (US); Brigham N. Johnson, Tampa, FL (US)

(73) Assignee: UnifiedVoice Corporation, Edgewater, MD (US)

( * ) Notice: Subject to any disclaimer, the term of this patent is extended or adjusted under 35 U.S.C. 154(b) by 915 days.

(21) Appl. No.: 11/842,758

(22) Filed: Aug. 21, 2007

(65) Prior Publication Data

US 2008/0091694 A1   Apr. 17, 2008

Related U.S. Application Data (60) Provisional application No. 60/823,000, filed on Aug. 21, 2006.

(51) Int. Cl.
*G10L 15/26* (2006.01)

(52) U.S. Cl. ........ 704/235; 715/738; 715/256; 715/201; 704/9; 704/275; 704/272; 704/251; 704/246; 704/1; 434/362

(58) Field of Classification Search ............ 704/1, 246, 704/272, 9, 235, 275, 251; 715/738, 256, 715/201; 434/362
See application file for complete search history.

(56) References Cited

U.S. PATENT DOCUMENTS

| | | | | |
|---|---|---|---|---|
| 4,965,763 A * | 10/1990 | Zamora | ............................. | 704/1 |
| 5,625,748 A * | 4/1997 | McDonough et al. | ........ | 704/251 |
| 5,729,741 A * | 3/1998 | Liaguno et al. | ........................ | 1/1 |
| 5,873,107 A * | 2/1999 | Borovoy et al. | .............. | 715/234 |
| 5,909,667 A * | 6/1999 | Leontiades et al. | ........... | 704/275 |
| 5,960,447 A * | 9/1999 | Holt et al. | ...................... | 715/201 |
| 5,995,936 A * | 11/1999 | Brais et al. | .................... | 704/275 |
| 6,026,363 A | 2/2000 | Shepard | | |
| 6,173,259 B1 * | 1/2001 | Bijl et al. | ....................... | 704/235 |
| 6,185,592 B1 * | 2/2001 | Boguraev et al. | ............. | 715/256 |
| 6,219,644 B1 | 4/2001 | VanBuskirk | | |
| 6,345,252 B1 * | 2/2002 | Beigi et al. | .................... | 704/272 |
| 6,370,503 B1 * | 4/2002 | Ortega et al. | .................. | 704/235 |
| 6,438,545 B1 | 8/2002 | Beauregard | | |
| 6,556,973 B1 | 4/2003 | Lewin | | |
| 6,738,784 B1 | 5/2004 | Howes | | |
| 6,766,328 B2 | 7/2004 | Stefanchik et al. | | |
| 6,813,603 B1 | 11/2004 | Groner | | |
| 6,823,331 B1 | 11/2004 | Abu-Hakima | | |
| 7,236,923 B1 * | 6/2007 | Gupta | ............................... | 704/9 |
| 2003/0028382 A1 * | 2/2003 | Chambers et al. | ............ | 704/275 |
| 2003/0101054 A1 * | 5/2003 | Davis et al. | .................... | 704/235 |
| 2004/0125131 A1 * | 7/2004 | Phelps | ........................... | 345/738 |
| 2005/0010411 A1 * | 1/2005 | Rigazio et al. | ................ | 704/246 |
| 2005/0060159 A1 * | 3/2005 | Jackson et al. | ................ | 704/275 |
| 2006/0172276 A1 * | 8/2006 | Higgins et al. | ................ | 434/362 |
| 2006/0200354 A1 * | 9/2006 | Ito et al. | ........................ | 704/275 |
| 2007/0005637 A1 * | 1/2007 | Juliano et al. | ................. | 707/102 |

* cited by examiner

*Primary Examiner* — Michael Colucci (57) ABSTRACT

A method of dictation in which authors may assign their own words or phrases (UnifiedWords) to introduce various subjects/document elements for a dictated document to be terminated with an ending word such as "end-it". After transcription the UnifiedWords, with associated dictated text, are submitted and automatically recognized as introducing data that may then be processed by the invention backend database program. Each UnifiedWord allows technical subject identifiers and the author's assigned familiar words for their dictation captions. All dictation applications are associated with the author. Dictation applications can be created for one document, a plurality of documents including integration with respective file access methods to update specific information such as electronic medical records, legal case files, law enforcement investigative reports, and other resource databases. The invention does not transcribe the voice files however; all methods of transcription are supported.

14 Claims, 7 Drawing Sheets

ALL VOICE TRANSACTION DATA CAPTURE—DICTATION SYSTEM

This application claims benefit under 35 U.S.C. 119(e) of provisional patent application 60/823,000, filed Aug. 21, 2006.

BACKGROUND OF THE INVENTION

This invention relates to a method of recording voice dictation, particularly a method that allows one or a plurality of voiced subjects (UnifiedWords) along with the dictated prose to be saved in a dictationbase by subject as computable data. The transcription results can then be processed as data for creating transactions required by the user (author) and their IT organizations. The applications created in the dictationbase are pre-configured for the requirements of each user (author) to assemble formatted documents while capturing the UnifiedWord identified data.

Dictation was started by Thomas Edison in 1877. Edison was trying to develop a machine that could transcribe telegraph messages and play them back, without requiring a person to retype the message. Realizing that the techniques he was using might also be used to record telephone messages, he sketched a diagram and handed it to one of his assistants, who promptly built what would become the first device in history capable of recording sound. Edison famously tested the machine by recording and playing back the words to "Mary had a little lamb."

Dictation devices have progressed over the years but there are very few traces of any new methods of dictation recording—they all appear to end up as what the Medical Records Institute calls "free-text". Free-text is problematic because it is unstructured data that is not computable in a digital environment; Free-text is difficult to search, sort, analyze, summarize, and present. It takes parsing or handling by someone, perhaps aided by, software, to use free-text to update legal case files, patient electronic records, knowledge management/intelligence or whatever requires a digital record structure. Dictation transcripts all these years have relied on manual parsing to change free text to digital data. The inventive method automates the capture of identified prose as structured data.

Our research with professionals that dictate indicated that the foundation of dictation (recording voice for transcription) is controlled by the age-old principles of planning and organization: outlining and then focusing on that outline during dictation. Those are good practices of dictation used by almost all authors. We have found that authors (1) know what the document name is, (2) know how the information is going to be used by others, (3) know where the information will be positioned on a document and (4) know whether the dictated information can and should be used as data that is computable to update some of their records and usually give explicit instructions to the admin staff to handle their transcripts. We also discovered that most have a preconfigured organization or outline of subjects that guide them when they dictate. Some have memorized the subjects in that organization while others think through their dictation as they create different portions of a document (forethought) at random. The principles of dictation mentioned above became the foundation for this invention—All Voice Transaction Data Capture-Dictation System. Currently literally all dictation is all voice however this invention adds a dictation technique in order to execute capture of data. After months of investigation, looking at knowledge language processing software, hand written selection or typing of choices and many discussions with physicians, attorneys, law enforcement officers, and other authors, we determined that the authors were the only ones who had first hand information about the subjects they dictate and if they were allowed to use their own words or phrases, which we call "UnifiedWords" to identify dictation subjects, they would be equipped better to document a transaction, event or whatever they had to dictate.

We also found that a multiple dimension identification structure of UnifiedWords could transcend standardization of nomenclature/taxonomies/anthologies by simply adding modifiers while recording UnifiedWords, such as "SNOMED" before the dictated colon, to a dictation subject/document element in order to include the standard prose vs. the authors prose or allowing a dual dictation one made up of the "SNOMED" standard to a subject/dictation document element. This allows, including the standard nomenclature in one output document and the author's free expression prose in a separate document. We discovered that authors' dictation organization embraces their work style, not the new standards or new technologies they are required to use. In order to adapt their work style with their vocabulary they can customize each dictation application UnifiedWord to suit their existing dictation requirements while maintaining freedom of expression. We also found that the institution and industry requirements prescribe what they have to document and sometimes the terminology or taxonomy they require the author to use to produce that documentation were not familiar for the authors dictation routine causing an immediate training problem. The multiple dimension UnifiedWords provides a simple method that allows a transition from current methods to new requirements that are handled by the UnifiedWords technology computerized database structure accommodating all parties involved in the management of dictation.

In 2005 the Medical Records Institute (MRI) estimated that $25 billion dollars is spent each year in healthcare for IT related to dictation transcription. That industry has always used the traditional record—a voice dictation that is transcribed mostly by manual typing from the voice files (MRI estimates that the industry employs 400,000 transcriptionists for the medical market). After transcription using the manual typed method or even with speech recognition someone or software has to parse through the unstructured free text and provide formatting, gather data and make the transcript useful for its intended purpose. Today with the apparent push to the electronic health care records and with the proliferation of data silos with digital information gathering on computers and networks, it is very apparent that a simple familiar method needs to be updated and changed in order to automatically capture transcripts as data vs. unstructured free text. Capturing dictation as data will transform the dictation process into a transaction entry capable environment that will save millions of dollars while providing accurate, detailed, identified information that can be used for further processing for research and even increase the accuracy of knowledge language software because their vocabularies can be refined to the specific subject dictated.

UnifiedWords technology provides a self training environment for dictation. The applications can be organized and customized by each professional author from their familiar dictation routine. The invention also provides a platform for people who want to dictate but who have had a hard time organizing their work style to produce output they can use for all kinds of transactions. They simply apply their own UnifiedWords to identify what they know and think about vs. what information someone else uses to identify that same information. The invention provides the tool they need to adjust from their education, training, and experience to the institution or organizations requirements.

Numerous industries, such as healthcare and law enforcement, are going through tremendous change and their associated documentation requirements are also changing. As an example of this change, when HIPAA was put into law by the healthcare industry the estimate of healthcare dictation/transcription was $15 billion annually. Now, a few years later the estimate is $25 billion. This is an example of authors changing their documentation habits (using their voice vs. hand writing or typing) to adapt to industry changes and looking for documentation capabilities that would save time, keep up with industry standards and make them more productive. Simply put, they need to work faster and achieve better results.

Some prior attempts to turn dictation into data are reviewed below.

U.S. Pat. No. 6,813,603 to Gromer requires a program running on a computer with speech recognition and template forms visually displayed to record verbal dictation. The author has to learn the technology and sit in front of a computer to use the invention.

UnifiedWord recording technique does not require a computer—but does require a dictation recording device—analog, digital or whatever is required by the transcription source. When necessary, UnifiedWords can be reviewed in a printed reminder list or displayed on a programmable hand held device that is used as a recorder for high quality wave files. UnifiedWord technology can use any transcription source. The only requirement is that the author or originator of the dictated files speak the UnifiedWords (using words no initialization or acronyms in order to improve speech recognition accuracy) before they dictate their content and end their dictation with the words "end-it".

U.S. Pat. No. 6,766,328 to Stefanchick discloses a system that requires an author to physically enter data as influence material described as codes or tags that can be used to help transform verbal data as identified data.

UnifiedWords technology requires the author to record verbally all words assigned and selected by the author to identify information. The words dictated identify the information for use as data without coding via a data entry.

Other Prior patents in this field include U.S. Pat. No. 6,026,363—Shepard, U.S. Pat. No. 6,556,973—Lewin, U.S. Pat. No. 6,738,784—Howes, U.S. Pat. No. 5,995,936—Brais, U.S. Pat. No. 6,219,644—VanBuskirk, U.S. Pat. No. 6,823,331—Abu-Hakima and U.S. Pat. No. 6,438,545—Beauregard.

SUMMARY OF THE INVENTION

The inventive method (recording voice for preconfigured subjects called UnifiedWords for transcription) adds new capabilities that allow, computer processing of dictation transcripts after transcription. The inventions uses, the second dimensions of the UnifiedWord technology to identify information recorded to tell the processing system "Here's what's coming"—and the first dimension of the UnifiedWord for transaction subjects, document elements, database field names or whatever is required to perform the work at hand. Each UnifiedWord is followed immediately by a colon or some other punctuation character, and the dictation is terminated by the ending words "end-it". Modifiers can be dictated before the colon after each UnifiedWord or after the colon. The modifier can be configured to perform author assigned task or information technology assigned task such as linking identified data directly to another disparate database. All dictation voice files transcribed using the UnifiedWord transcripts are processed as computable data by the computer resident database after transcription and proofreading. All methods of transcription, work with UnifiedWord Technology.

The invention allows the use of voice to document one or more UnifiedWords subjects/elements required during dictation. After transcription, the transcript is processed by software of a (database) dictationbase to allow unique transcript automation capabilities for anyone that dictates or has a desire to dictate to accomplish work faster and more accurately. The UnifiedWords are chosen by the author/writer to identify information that follows the UnifiedWord and a colon, then the dictated information and finally the UnifiedWord prose is terminated by the words end-it. Voice files recorded are transcribed by any source allowing the authors to go about their business routine. Any UnifiedWords required for dictation applications that are skipped during dictation or inadvertently left out of the voice file by the author are highlighted in the assembled documents as well as review screen displays for each completed transaction.

Administrative staff places the first dimension of each UnifiedWord in a document in the format <<<unifiedword>>> so that the first angle bar < is located in the exact print position of text that will be merged during processing and loaded into the dictationbase as subjects requiring dictation. Any UnifiedWord can be preconfigured in the type once file. If the preconfigured type once UnifiedWord is used in the preconfigured application those UnifiedWords configured in the type once application will use the preconfigured data in the type once file eliminating those subjects/document elements from the application reminder list. That saves the author valuable time and increases that accuracy of data that can be configured as private secure data that will not be exposed when voice files are sent out for transcription.

The present method creates a UnifiedWord dictationbase storing each subject/document element in the nucleus or baseline database for all dictation items used in the dictation application. Each author can use existing UnifiedWords while retaining their database features for their own applications as well as add their own UnifiedWords with database features for use in their dictation. Each author can rename existing application names and UnifiedWords retaining the dictationbase database features for their own dictationbase eliminating duplication of the baseline UnifiedWords when creating their own dictation applications.

Each UnifiedWord can be created by any author or staff and then utilized by any other author by copying a whole application or creating their own documents using their own UnifiedWords to identify information in their documentation. The author simply studies the available UnifiedWords, then assigns them in the actual print positions of the required documentation or integration required (integration can use a list of UnifiedWords for example a schema of another database in the UnifiedWord format). The inventive applications transcend the longevity of staff that works for the author. Employee turnover and associated loss of productivity is minimized because the applications stay in the author's dictationbase providing all of the application features to train a new or temporary employee.

The invention provides the author and/or his staff with tools that allow them to prescribe dictation applications quickly, keep them up to date and synchronize application UnifiedWord reminder list with capable dictation devices—such as a PDA, Smartphone/PDA, desktop computer, intranet, internet or any other programmable smart device that allows programmatic recording of voice while displaying a reminder list of subject words. Those authors can also print a spaced reminder list for taking hand written or electronic notes for review during their dictation session.

The UnifiedWord system allows use of any transcriptionist or transcription source or speech recognition or any combination thereof.

After completion of a dictation session—then weeks later you want to look for information relative to that dictation—you can query the dictationbase and display or print the relative information for review or reuse (every word is indexed for easy retrieval) and because the UnifiedWords provide control of what information resides where it can be used as de-identified information for the healthcare industry.

An author will be able to reuse prior dictation applications simply by providing the address ID of a previous dictation as a lookup key for a new dictation then dictating just those subjects/document elements that need updating. It is not necessary to start a new dictation every time. For example, a medical examination dictated in 2005 can be reused in 2006 by dictating only the significant positive indications found in 2006.

An author will be able to append information to a UnifiedWord subject in a previous dictation transcript by simply dictating the address ID of a previous dictation then dictating only those UnifiedWord subjects that need appended information. Appended information will be displayed with time date and author's ID in the resulting documentation or integration in order to establish accountability in the appended record.

This dictation system takes very little training because it simply automates what an author always does. The author's knowledgeable staff can set up the applications, and then the author reviews the output assigning his or her own one or more words that tell the system "Here's what's coming—subjects". Each application allows printing of a reminder list (spaced for hand written notes) organized by application name and the author knows that because he names the application using the UnifiedWord (one or more words). The author has complete control over the application name and all subjects that make up the application. Making setup of an application easily explained and consistent by using the easily understood markup technique <<<UnifiedWord>>> making the invention useful for many business sectors that dictate to speed up documentation and for new users that want to learn to dictate.

The freedom of expression that makes dictation so useful is retained because all information is identified by the invention UnifiedWord technology.

The invention provides an author with the capability to dictate one or a plurality of subjects or document elements they name individually in the following spoken format. Subject/document element identification in their assigned one or more words a colon followed by their normal free expression dictation and then ending each subject/document element with the phrase "end-it". For example, the user may say (a) a UnifiedWord (one or more words) colon, then (b) free expression dictated copy and then (c) "end-it". The ending words "end-it" are preferred, but they could be replaced in the dictationbase software by some other choice. The user can also dictate multiple kinds of modifiers that change the vocabulary or taxonomy of a UnifiedWord. The modifiers can be after the UnifiedWord before the colon or after the UnifiedWord colon to add dictation related functions.

The invention provides an author with the capability to dictate the name of an application before dictating the subject/document elements in order to automate the processing of a transcript with the dictationbase.

The invention allows authors to create a type-once database that stores repetitive data for use in their dictations. A physician, for example, could store all patient information and use a lookup key to dictate access and integrate that data in their documentation. This method helps the physician protect the HIPAA patient protected information by keeping it all on their premises, avoiding losing control of the patient information in an off-premises transcriptionist computer or transcription service computer system. The type-once database is created from a list of UnifiedWords—automatically creating the database and the data entry screen used for entering the information. A custom extension would allow this capability to access and read and write capabilities for data residing in resource SQL databases. The read and write capability using a look-up key compatible with the dictationbase and the resource data base allows continuous updating of both databases in real-time.

The present invention provides the following methods for use by authors: The method maintains all dictation applications by author to identify subjects/document elements using their own words as identification.

The method includes prescribed subjects/document elements of a transaction that do not change—signature, default text, normal healthcare prose, logos are four examples.

The method files the preformatted documents in the database for use during computer processing so that the data or text always is consistent in its presentation.

The method allows the author the ability to dictate transactions in random order but always presents them in the author's specified sequence.

The method allows authors to assign their own one or more words as dictation subject captions in the second dimension to identify transaction subjects identifiers marked up as the document subject element in the first dimension of the UnifiedWords for the two dimension identification of transaction subjects/document elements.

The method provides fill-in-the-blank subjects/document elements for legacy documents, templates, forms and database transactions.

The method provides an application nesting environment allowing the author to produce multiple documents, files, integrated database entries or what ever may be needed to complete the transactions using one dictation session.

The method provides pre-configured applications for the healthcare industry filed by specialty.

The method allows institutions or organizations to develop pre-configured applications using industry or institution nomenclature in the first dimension of the UnifiedWord. Authors can assign their UnifiedWords to nesting their applications with institution or organization applications for their own use while maintaining the integrity of the original applications.

The method allows highlights for mandatory transaction subjects/document elements that were not dictated or by the author.

The method automatically duplicates UnifiedWord document subjects/document elements in one or a plurality of applications dictated in one session.

The method appends document subjects/document elements including transaction appended date and time while maintaining identification of author that created the appended copy.

The method provides command extension capability that is not part of the user's dictation vocabulary or speech recognition dictation vocabularies.

The method provides input/merge to and from most popular word processing programs.

The method provides data output by ASCII file format or XML with designated delimiters as well as SQL connections.

The method provides unlimited file size for each subject/document element in a transaction.

The method provides extensions to validate data to assure accuracy and highlight out of range information.

The method provides capabilities to include images, video snips and other technology as subjects/document elements of the documents and transactions.

The method allows implementation of the whole platform on windows desktops and servers, intranets, the Internet, WAN and other necessary computer platforms.

The method provides for default or normal text for designated subjects/document elements—any dictated transcription is used automatically for the subject element for the transaction.

The method provides a subject/document element that allows the author to speak a select word from one or a plurality of defaults to include in that subject/document element.

The method provides a print/display only subject/document element.

The method provides a print/display replacement subject/document element.

The method allows information technology organizations to customize the use of each subject/document element beyond the methods mentioned above.

The method captures dictated transcribed and corrected information that can be used selectively to create a transcript proof reading technology based on the word familiarity collected for each author. The proof reading can be performed selectively by UnifiedWord or application or both.

The dictationbase of the author can be used to select UnifiedWord identified subjects or document elements to train speech profiles for Speech recognition vocabularies increasing the accuracy of the automatic speech recognition.

The dictationbase UnifiedWords in the nucleus can be attached to new taxonomies using a modifier to change the vocabulary (for example SNOMED) after the UnifiedWord and before the colon providing a dual dictation capability to adopt new standards published by authorities that work with for example billing systems and other systems based on the standards published.

The method allows information technology departments to use the isolated and identified dictated transaction data in the following ways:

Capture data and documents

Transform, in real time, the data to correct formats

Assemble data and content intelligently, dynamically and in real-time

Repurpose data and content to make it relevant to, and personalized for, any author and the organization simultaneously Transport dictation data securely between applications, systems, or authors administrative systems Route data Load business-critical information into any database, archive, or application Deliver actionable information (reports, database transactions and more) over any electronic channel required Present the resulting information in the formats preferred by the author and another for the organization Display the resulting information in the preferred format in the preferred location either as a printed document or computer screen display The invention allows use of voice to document one dictation UnifiedWord subject/element or a plurality of UnifiedWords subjects/elements required during dictation. After transcription the transcript is processed by software of a (database) dictationbase to allow unique transcript automation capabilities for anyone that dictates or has a desire to dictate to accomplish work faster and accurately.

UnifiedWords identify database fields and the method could use most database technology.

UnifiedWords allow dictation author/writers to identify subjects and document elements in their own one or more words while retaining database definitions assigned by an organization or institution staff that are maintained in the first dimension of the UnifiedWord.

The UnifiedWords can be created in the dictation application output document or in the application database file, but may be changed to suite the author's choice of words for their dictation session.

The UnifiedWords can perform integration for automatic input to and from resource database such as Electronic Medical Records, legal case management systems, law enforcement case system and any other legacy data silo. The integration can also be from a type-once database created by the author's organization.

UnifiedWords created for integration can be used over and over by multiple authors in their own custom dictation applications retaining the database assigned definitions originally setup in the dictationbase UnifiedWord first dimension, while still allowing assignment of their familiar words as the second dimension that are familiar to their work style.

UnifiedWords are established and maintained in the dictationbase by programmatic review of each document to establish the first dimension of the UnifiedWord in the dictation application by entry of the second dimension entered after assignment by the author. Any previously assigned UnifiedWords by an author are programmatically assigned by the computer software.

All dictated information is maintained by UnifiedWord in the dictationbase.

All UnifiedWords are dictated by the author prior to the normal free-text dictation, which is terminated by ending words such as "end-it".

The UnifiedWord invention provides the following methods for use by authors:

The method maintains all dictation applications by author to identify subjects or document elements using their own words as identification.

The method provides formatting so that the data or text always is consistent in its presentation.

The method provides fill-in the blank subjects/document elements for legacy documents, templates, forms and database transactions.

The method provides an application nesting environment, allowing the author to produce multiple documents, files, integrated database entries or what ever may be needed to complete the transactions using one dictation session.

The method provides capabilities to dictate highlighted text in color.

The method allows pre-configured applications for the healthcare industry filed by specialty that can be modified by each author by simply assigning their own words as the UnifiedWords.

The method allows highlights for mandatory transaction subjects/document elements that were not dictated or by the author The method automatically duplicates document subjects/document elements in one or a plurality of application dictated in one session.

The method allows authors to append document subjects/document elements by including transaction identification.

Appends include date and time while maintaining identification of author that created the appended copy.

The method provides command extension capability that is not part of the users dictation vocabulary or speech recognition dictation vocabularies The method provides input/merge to and from most popular word processing programs The method provides data output by ASCII file format or XML with designated delimiters as well as SQL connections.

The method provides unlimited field size for each subject/document element in a transaction The method provides extensions to validate data to assure accuracy and highlight out-of-range information The method provides capabilities to include images, video and other technology as subjects/document elements of the documents and transactions The method allows implementation of the whole platform on intranets, the Internet, WAN and other necessary platforms The method provides for default or normal text for designated subjects/document elements—any dictated transcription automatically is used for the subject element for the transaction The method provides a subject/document element that allows the author to speak a selection word (1 to 4 Words) from one or a plurality of defaults to include in that subject/document element. The selection words display on some versions of the Reminder list as the line following each UnifiedWord.

The method allows information technology organizations to customize the use of each subject/document element beyond the methods mentioned above The dictationbase of the author can be used to select UnifiedWord identified subjects or document elements to train speech profiles for Speech recognition vocabularies increasing the accuracy of the automatic speech recognition.

The dictationbase UnifiedWords in the nucleus can be attached to new taxonomies providing a dual dictation capability to adopt new standards published by authorities that work with for example billing systems and other systems based on the standards published.

BRIEF DESCRIPTION OF THE DRAWINGS

In the accompanying drawings,

FIG. 2 A shows the flow of creating a type once reference dictationbase to supply information that is used repeatedly for many dictations;

FIG. 2 B shows the flow of integration of outside database information used instead of the type once database or in conjunction with the type once database;

DESCRIPTION OF THE PREFERRED EMBODIMENT

Figure 1:
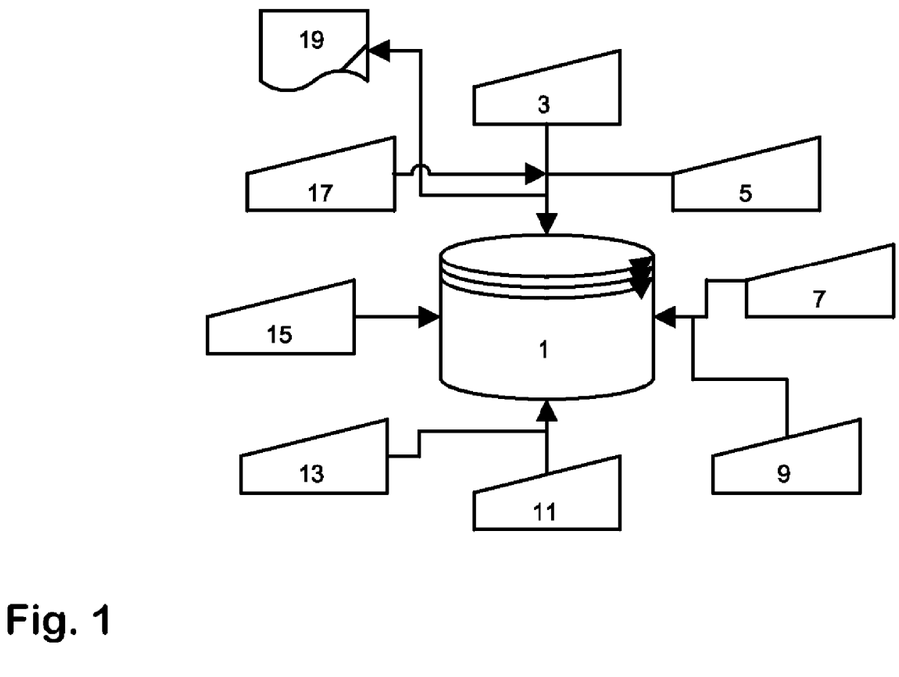
FIG. 1 is an overall view of a system embodying the invention.

A voice transcription organization embodying the invention is shown in FIG. 1. The diagram depicts the entry of seven components in the user database of the invention. The user base 1 interacts with all components of the dictationbase and users. The user base establishes password use, security and access to an author's dictation files. All demographic information 3 about the author used in dictation as well as accounting for the dictation is entered into the user base. The authors preferred transcriptionist and administrative staff FIG. 1.5 are assigned including backups if the lead transcriptionist is not available including their passwords phone numbers etc. Multiple speech recognition systems FIG. 1.7 can be entered along with the author's user ID's. Any outside services and their local addresses, FTP site or access etc. FIG. 1.9 are entered as well. Multiple signature protocols FIG. 1.11 can be entered and assigned to individual applications that an author uses. Workflow control FIG. 1.13 of the authors voice and transcript files are entered to establish who is doing what when etc. Author file tracking FIG. 1.15 is set up with various reports that print or display by the author, transcriptionist or administrator. Accounting controls FIG. 1.17 are entered. Various reports FIG. 1.19 can be printed to accommodate the author and staff.

FIGS. 2A and 2B depict the flow of creating a type once reference dictationbase to supply information that is used repeatedly for many dictations As shown in FIG. 2A, access of all parties working in the system is under password control A5 in the user base 1. Staff creates a list of UnifiedWords for the type-once database. The database is called type-once because data is entered into the database one time then used over and over. Normally an administrative person would type the information for each dictation by reviewing a file or importing the data using specialized software. One may use any database that can store textual information. OpenInsight by Revelation Technologies has been used for this automation.

An author or administrative assistant A1 reviews current dictation documentation A3 to identify subjects/document elements (UnifiedWords) that do not change or repeat during multiple dictations by the author when documenting related events or circumstances with prose. He creates a list of those subjects that will not change from dictation to dictation (for example attorney name or patient name, address, etc.—items used in multiple dictations) in a word processing file with the file extension TXT. The file is saved in a computer directory that can be browsed in order to find the file. The file should be named to identify the information—patient file, legal client file, defendant file, attorney file etc. One subject identifier/document element in the file should be unique to the information in the file and designated to be used as a look-up key during creation of the TXT. (The subjects in the database can be retrieved by entering or dictating a look-up key/reference file number, case number, encounter number or some other appropriate look-up key.) The format for one or a plurality of subjects/document elements on the list <<<subject one or more words >>> in the word processing file with the TXT extension. The software A11 locates the TXT specified for processing.

The type-once list A12 is programmatically examined and automatically loaded into the dictationbase A13. The user is then queried to identify what subject will be assigned as the lookup key—subject for the information in the database—selection of the item from a drop down list designate the lookup subject. An entry screen display creation function is selected at A15.1 and a name for the data entry application screens or screens is entered. The name of the database created at A15.2 is saved. The program automatically creates a menu item A19 and an actual data entry display screen A17 or required screens in the order of the subjects in the original RTF list.

An online connection A21 enables one to read and write directly from and to a resource database of and organization providing the capability to update and use the data in the resource to reduce the actual dictation to the important subjects that detail the transaction. The significance of this capability in many healthcare installations will allow dictation that is generated while in the work environment using wireless microphones speech recognition and automated validation and proof reading of transactions.

As shown in FIG. 2B, the author's IT organization B1 outputs a schema B3 of a database where information resides that the author can use during transcript processing to accurately fill in to automatically fill in information that is normally typed from available files during dictation transcription. The schema B3 is imported into an RTF or XML file with the UnifiedWord format described in A1 above. The RTF document B4 with the schema B3 is edited by an admin staff member—where UnifiedWord descriptors from the schema are not easily understood they should be replaced with meaning full descriptor words that can be reviewed by an author for appropriateness. This is an important step because the database schema imported was created by programmers for programmers and need to understood by all users of the dictation system for use in the various dictation applications required. The RTF or XML file is then saved to a directory that can be browsed to for input and examination by step A12 above. The remainder of the procedure follows steps A13 through A19 as described above.

Figure 3:
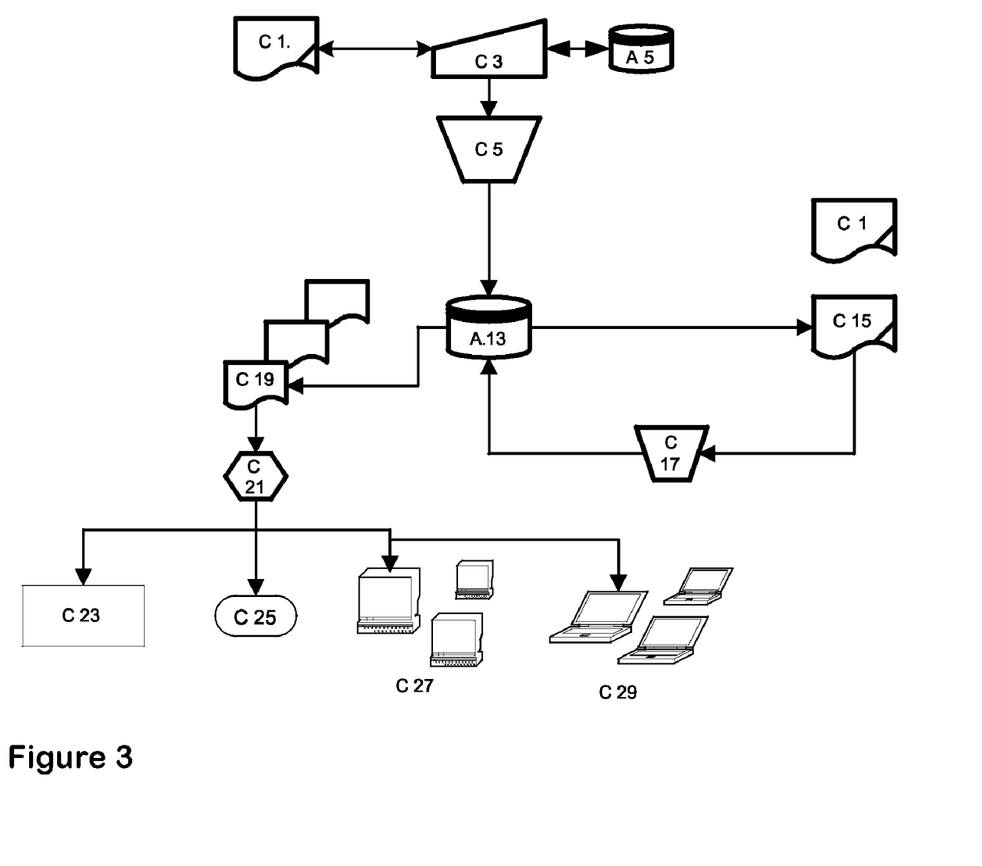
FIG. 3 is a flow diagram of creating a one document transaction application for a dictation author links of subject to outside database items and updates of outside database items.

FIG. 3 shows steps of creating a one document transaction application for a dictation author.

The author selects a pre-formatted document C1 (a template used for word processing or speech recognition) or creates a formatted document in a word processor or a list of UnifiedWords and saves it as an RTF word processing document with a recognizable name comprised of identifying words. The author assigns their own one or more words in the manner that describes the subjects or document elements.

The author tags all subjects C3 to be printed in the formatted documents for dictation and/or imported from the resource database or databases created in A13 and B1 above. Tags of UnifiedWords are in the following format <<<subject words>>>, <<existing reference subjects words>> or <<reference words imported from other databases>>. Notice that most current imports in templates use two << >> angle bars and the invention uses those with custom coding to connect that resource database as well as three <<<angle bars>>> Print the document, review and assign a plurality subjects with tags <<<subject words>>>. The first < of each subject is positioned in the exact print position for that subject in the document.

Figure 6:
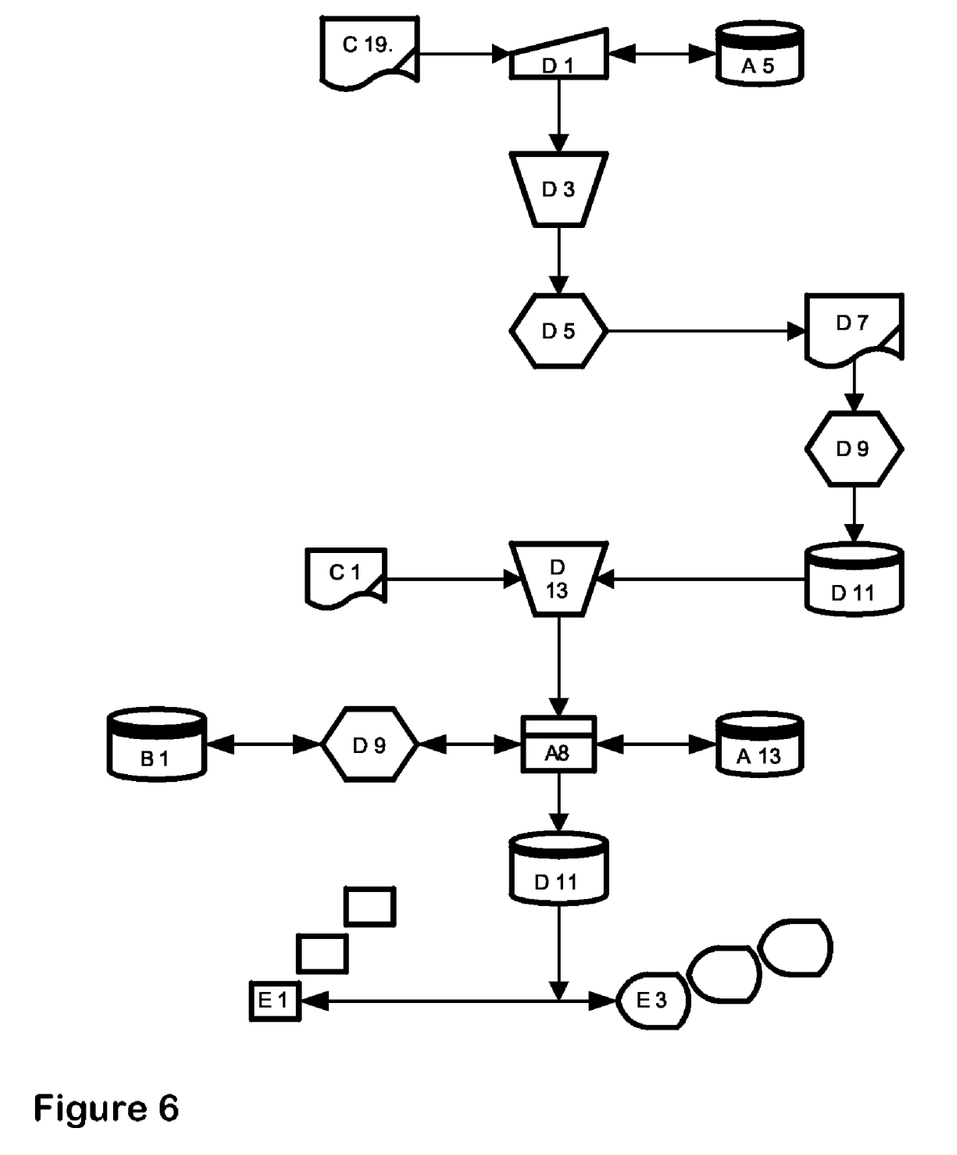
FIG. 6 illustrates the flow of an author dictating with an application that has multiple documents and transactions, links of subject to outside database items and updates of outside database items.

The new dictation application C5 is saved to the dictationbase A13. Then the application is recalled and a reminder list of subject words C15 is printed. The tagged UnifiedWords added to the dictationbase set up in A13 and B1 are automatically linked to the application subjects identifiers in the template and do not show up on the reminder list C15. The dictation author reviews the list of in the document and notes on the reminder lists C15 the exact one or more words he or she desires for each subject dictation caption then has an admin staff enter the words. Those assigned words replaced are used during dictation for the application instead of the original subject identifiers words tagged in the document in C 3 above. The new words entered are the authors dictation subject captions that they want to say during dictation of each subject. No author assignment of dictation subject captions allows the use of the subject identifier words tagged in C 1. Entry of dictation subject captions by the Author replaces words tagged in C 1 and updates the reminder list accordingly. The final reminder list can be printed for visual reference or distributed via synchronization to PDA's or Smartphone C23, an Intranet or Internet Site C25, desktop personal computers C27 and laptops C29, all under author password access so that each author can review their own list as a dictation subject caption guide whenever necessary, as shown in FIG. 6.

Figure 4:
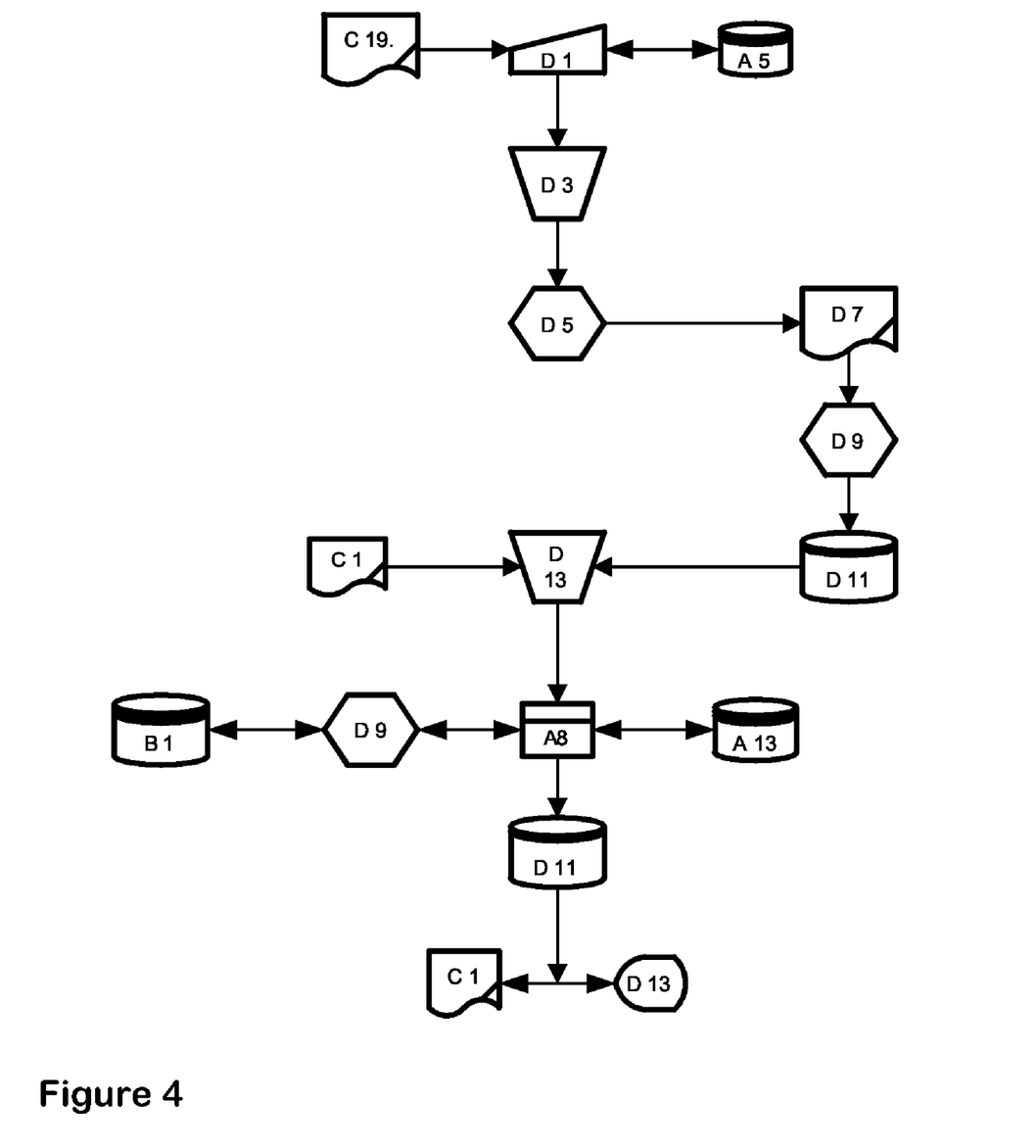
FIG. 4 shows the flow of an author dictating the one document transaction application.

FIG. 4 is the flow of an author dictating one document transaction application

The author can now use the dictation application C19, first recording the application name followed by a colon followed by actual dictation of the application name and terminating with the word "end-it". The author can dictate the application name at any point during the dictation session. The dictation order does not matter. The author then records the subject UnifiedWords with a colon then their dictation with necessary punctuation (period, comma, quote, unquote, new line, new paragraph etc.) Each dictation UnifiedWord subject and prose is followed by the terminating words end-it which signals the end of that subject's dictation. A. plurality of dictation subjects can be voiced in random order allowing the author to dictate their thoughts as they would normally. Any subjects linked to the database created in A13 above requires the author dictate a subject look-up key for the information that will be used in the dictation output document After completing the dictation the author saves and names the file then submits the recorded voice for transcription by any source of transcription services or a speech recognition system. After transcription editing and proofreading the transcript is returned to a designated directory and submitted for programmatic processing. The processing reorders all subjects as necessary then merges the transcript information with the original document. Any information entered into the reference database created in A 13 above automatically populates corresponding subjects tagged in procedure C 3. The output generated by the processing which includes sorting, comparing, identifying, merging, and read/write to the C1 document as well as connected resource B1 database applications and the A13 dictationbase. All information created by the Dictation application UnifiedWords is saved in the dictationbase for reuse by future dictations; look up of any information by subject or a D13 query searching for specified information designated by the user.

Figure 5:
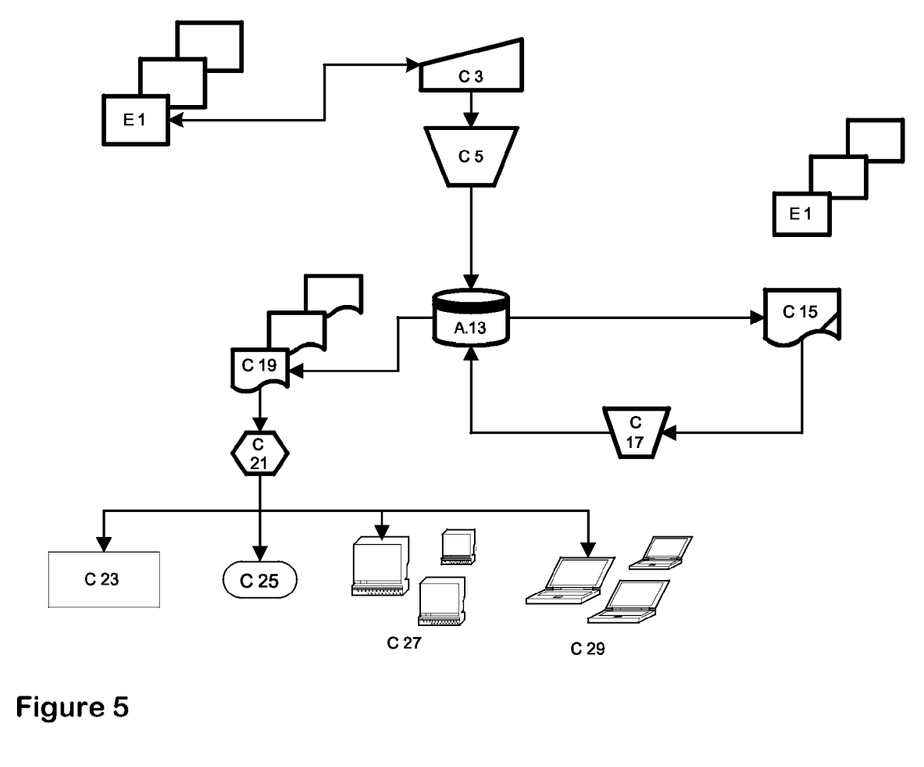
FIG. 5 shows the flow to create a multiple application transaction dictation application.

FIG. 5 is the flow to create a multiple application transaction dictation application.

Figure 2:
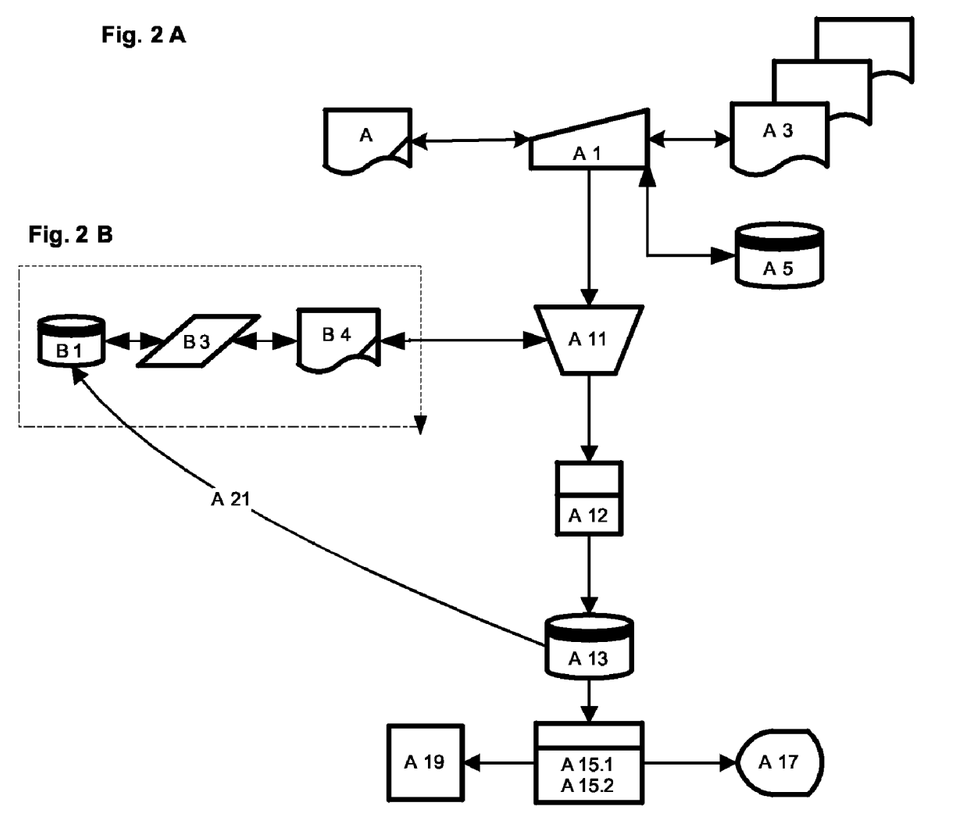

In FIG. 5, the italic type indicates the only changes required to creating a single document application described in FIG. 2 above—the remainder of the explanation is the same as the single document.

The user may select from a plurality of pre-formatted documents E1 (templates used for word processing or speech recognition) or may create formatted documents in a word processor or a just list of Unified Words and save as an RTF or XML word processing document with a name comprised of identifying words that can be voiced for identification during dictation or just recognized as subjects that and author can use to assign their own 1 to 4 words in the manner that they relate to the subjects or document elements. Simply add the first application then check the append capability in order to add each application. The author tags the subject to be printed as described above.

Figure 7:
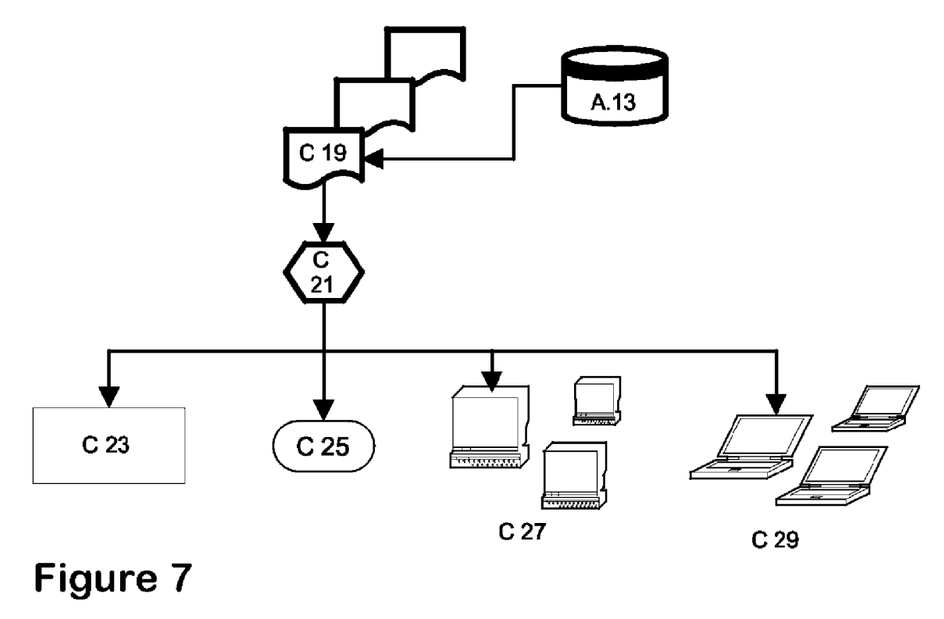
FIG. 7 shows the flow of reminder list distribution.

FIG. 6 illustrates the flow of an author dictating with an application that has multiple documents and transactions, links of subject to outside database items and updates of outside database items The reminder list, distribution of which is shown in FIG. 7, provides a self training asset for the system that is distributed to each Author by a synchronization mechanism. The target markets for the product healthcare, law enforcement, legal, government and commercial executives and new users who want to learn to dictate and need a simple organization for their dictation applications. The reminder list provides a comfortable way to remind each author of the exact subjects they need to address during their actual dictation session. The reminder list provides the capability to train that list as part of building author specific vocabularies for speech recognition systems. The lists are easy to display with word processing technology and are useful for a transcriptionist or transcription organization to file and display by author utilizing little storage. The reminder list is used during transcription to ensure all subjects were dictated by the author, and that actual dictation of the subjects are correct so that processing on the backend will be correct.

What is claimed is:

1. An organization system for an All Voice Transaction Data Capture-Dictation System consisting of:
   a) a user dictation producing input voice files including documentation subjects while capturing subjects as computable data,
   b) a dictation technique used to introduce a plurality of one or more words dictated subject captions to identify free expression prose including an ending phrase "end-it," the ending words "end-it" are preferred, however they could be replaced in the dictationbase software by some other choice;
   c) using a prescribed preformatted template rich text format (RTF) word processing file including tagged subject identifiers to setup each dictation application;
   d) dictating a voice file using dictation subject captions listed on a reminder list outline to be recorded with prose as a voice file compatible with listening and playback used by the transcription source,
   e) submitting the transcript produced from the dictated voice file including dictated subject captions, colon, or some other punctuation character to identify prose terminated by the phrase "end-it" as transcribed by any transcription source; for computer processing (programmatic processing recited)
   f) storing prescribed dictated prose with dictated subject captions in the dictation application including the user as an indexed textual database table as organized in the dictationbase,
   g) storing pre-configured applications including those for the healthcare industry filed by specialty,
   h) storing transcripts comprised of dictated subject captions (one or more words) with prose dictated,
   i) storing a prescribed dictation application by address ID and the specified user,
   j) setting up, entering and accessing a secure type-once subject identifier data table configured for use with multiple applications including one or more unique subject identifiers to be used as the look-up key,
   k) entering static data (user, and staff) in the secure dictationbase system,
   l) entering type-once private secure essential data including elements for use in multiple dictation applications;
   m) users assigning and entering (one or more words) as dictation subject captions,
   n) dictating a subject caption "application name" followed by a colon or some other punctuation character including the application name and the phrase "end-it" to terminate the entry,
   o) selectively dictating subject captions with a prescribed modifier uttering assigned words (one or more words) to insert default copy stored in the dictationbase to assemble the final documentation during computer processing,
   p) uttering a prescribed modifier for each dictated subject caption before the colon or some other punctuation character or after the colon with or without including prose followed by "end-it";
   q) submitting for computer processing transcripts with dictated subject captions with prose followed by "end-it", preformatted templates, type once data subject identifiers, including the user identification to assemble documents and store dictated subject captions by subject identified data in the specific dictation application by address ID,
   r) submitting for computer processing dictated subject caption identified prose in transcripts including sorting, comparing, identifying, merging, including reading/writing to document templates and executing defined read/write connections with resource databases.
   s) searching indexed information by dictated subject caption, subject identifier and/or specific prose dictated information designated by the user.

2. A database (dictationbase) system described in claim 1 wherein prescribed document templates are created for any industry sector that dictates voice files for transcription including user dictated subject captions with prose followed by the termination phrase "end-it" as identified data.

3. A database (dictationbase) system described in claim 2 comprised of creating, storing, and maintaining the prescribed templates, voice file transcripts with dictated subject captions in the indexed dictationbase by address ID for assembling documents and capturing subject identified computable data.

4. A system as described in claim 1 wherein the RTF subject identifiers and dictated subject captions prescribe identification of the prose identifiers.

5. A system as described in claim 1 that can use database field names from resource database systems or files comprising the subject identifiers in the prescribed dictation applications tagged RTF template for identified data capture with prescribed connections for the resource data files or database systems.

6. A system as described in claim 1 wherein the users prescribed dictation applications are stored in the dictationbase automatically creating the reminder list outline as a dictation reference guide for assigning a plurality of dictated subject captions.

7. The voice recording recited in claim 1 is transcribed/proofread by any source or system so a subsequent transcript can be submitted by the means recited computer processing for use by the dictationbase system comprising steps of:
   Including:
   a) creating the dictationbase dictation application for one or more documents wherein the tagged subject identifiers are stored in the dictationbase by the means computer processing from preformatted word processing templates or list to be used to assemble documents including matching dictated subject captions together with prose, type once data subject identifiers for subsequent transcript processing, including a plurality of tagged subject identifiers comprised of each subject, document element, database field and prescribed connections to resource systems, type once data fields, industry standard identification or staff assigned document data subject/elements;

b) the dictation user designated for each application assigns and enters familiar (one or more words) comprising subject identification for dictated subject captions in their dictation routine or uses the subject identifiers absent any assigned entry as the dictated subject captions;

c) the dictationbase application produces the reminder list of dictation subject captions to guide the user for the voice recording technique recited in claim 1 comprised of uttering the dictation subject captions with or without modifiers followed by free expression information relevant to said subjects and at least one term indicating an end of said information "end-it";

d) the voice recording dictated in claim 1 is transcribed so the subsequent transcript text file with dictated subject captions including prose can be processed by submitting for computer processing including dictated subject captions review for user dictated modifiers and assembly functions for preformatted documents as well as storing each captured dictated subject caption with dictated prose in the dictationbase by all identifications.

e) the computer processing recited in claim 1 comprised of assembling one or more documents while capturing and storing a plurality of dictated subject captions with prose as computable data in the dictationbase including executing prescribed connection updates for resource database fields.

8. The system of claim 7, wherein the user can assign his or her own one or more words as dictated subject captions, comprised of preconfigured multiple dictation modifiers dictated after the dictated subject captions before the colon or after the colon using the dictation technique including functions and/or prose prescribed for the specific transcript processing.

9. The system of claim 1 wherein information technology organizations can prescribe multiple methods of application subject identifiers to automate transactions required by there organizations.

10. The system of claim 1, wherein the user dictates a plurality of dictated subject captions with modifiers before or after the colon and/or prose in any preferred order necessary to complete the dictation application.

11. The system dictation recording of claim 1 wherein a dictated color modifier before the prose highlights the prose in that color.

12. The steps of claim 7 consisting of submitting one or more documents nested in their prescribed formats adding subject identifiers as well as entry of dictated subject captions wherein one reminder list eliminates duplication of dictated subject captions for one dictation session.

13. The reminder list recited in claim 1 wherein the list can be printed for visual reference or distributed via synchronization to smartphones' for display during dictation or for visual reference on an Intranet or Internet Site for display on desktop personal computers, laptops, or any smart device that allows programmatic recording of voice all under password access so that each user can visualize their own reminder list for each dictation application whenever necessary.

14. The system of claim 7, wherein users organize, define, and automate dictation applications to capture identified data while assembling formatted documents.

* * * * *